United States Patent
Boggs et al.

(10) Patent No.: US 10,341,347 B1
(45) Date of Patent: Jul. 2, 2019

(54) NON-RESPONSIVE NODE ACTIVITY AVOIDANCE IN A NETWORK STORAGE SYSTEM

(71) Applicant: Teradata US, Inc., Dayton, OH (US)

(72) Inventors: Gary Lee Boggs, San Diego, CA (US); William Timothy Sanders, San Diego, CA (US)

(73) Assignee: Terdata US, Inc., Dayton, OH (US)

( * ) Notice: Subject to any disclaimer, the term of this patent is extended or adjusted under 35 U.S.C. 154(b) by 0 days.

(21) Appl. No.: 14/984,778

(22) Filed: Dec. 30, 2015

(51) Int. Cl.
   *H04L 29/06* (2006.01)
   *H04L 29/08* (2006.01)

(52) U.S. Cl.
   CPC .......... *H04L 63/10* (2013.01); *H04L 67/1097* (2013.01)

(58) Field of Classification Search
   CPC ....... H04L 9/32; H04L 63/10; H04L 67/1097; H04L 12/42; H04M 3/00; G06F 12/00; G06F 12/14; G06F 11/00; G06F 11/30; G06F 11/07; G06F 11/14; G06F 17/30; G06F 15/173; H04N 7/173; G01R 31/08
   USPC ..... 726/4; 713/150, 168, 171; 455/418, 411, 455/414.4, 419, 420; 705/14.64; 711/152, 147; 725/107, 124, 125; 370/216, 241, 242, 244, 449; 709/223, 709/224; 714/4.3
   See application file for complete search history.

(56) References Cited

U.S. PATENT DOCUMENTS

| | | | |
|---|---|---|---|
| 7,594,252 B2* | 9/2009 | Johnson | H04L 43/0811 370/216 |
| 8,532,640 B2* | 9/2013 | Bussey | G06Q 30/0601 455/411 |
| 9,141,480 B2* | 9/2015 | Nowoczynski | G06F 17/30097 |
| 9,176,834 B2* | 11/2015 | Griffith | G06F 11/2048 |
| 9,577,830 B2* | 2/2017 | Bishop | H04L 9/3268 |

* cited by examiner

*Primary Examiner* — Thanhnga B Truong
(74) *Attorney, Agent, or Firm* — Randy L. Campbell, Jr.

(57) ABSTRACT

A method of operating a data store system may include generating a registration key in response to identify a non-responsive processing node in a plurality of processing nodes. The method may further include providing the registration key to the other processing nodes of the plurality of processing nodes excluding the identified non-responsive processing node. The method may further include providing the registration key to a plurality of storage cluster nodes in communication with the plurality of processing nodes over a network. Each storage cluster node may be configured to manage access to a respective set of persistent storage devices. Each processing node provided the registration key may be authorized to access each of the persistent storage devices. A system and computer-readable medium may also be implemented.

20 Claims, 8 Drawing Sheets

NON-RESPONSIVE NODE ACTIVITY AVOIDANCE IN A NETWORK STORAGE SYSTEM

BACKGROUND

A database is a collection of stored data that is logically related and that is accessible by one or more users or applications. A popular type of database is the relational database management system (RDBMS), which includes relational tables, also referred to as relations, made up of rows and columns (also referred to as tuples and attributes). Each row represents an occurrence of an entity defined by a table, with an entity being a person, place, thing, or other object about which the table contains information.

Database systems and other data stores may include numerous processing nodes used to execute database queries, as well as other database utility operations. In some scenarios, a processing node may fail to appropriately respond to the other processing nodes in the system, but may still be capable of performing input/output (I/O) to the disks storing database data. In this situation, even though the other processing nodes may be able to perform the responsibilities of the failed node, the failed node may begin to operate again. This results in two processing nodes running at least some of the same processes, which may both independently write to the same disks. This condition can result in undesirable manipulation of the database data.

In a network setting, storage cluster nodes may provide network access to data on storage devices to the processing nodes. Some storage cluster nodes may implement small computer system interface (SCSI) protocols, such as "inquiry" and "persistent reservations" in order to prevent these failed nodes to access data on the storage devices. However, some storage cluster nodes do not implement such protocols or may implement only portions, and thus, may expose the storage devices to undesired access from these failed nodes. Thus, a protection scheme for storage devices in such a network configuration is desirable.

SUMMARY

According to one aspect of the present disclosure, a method of operating a data store system may include generating a registration key in response to identification of a non-responsive processing node in a plurality of processing nodes. The method may further include providing the registration key to the other processing nodes of the plurality of processing nodes excluding the identified non-responsive processing node. The method may further include providing the registration key to a plurality of storage cluster nodes in communication with the plurality of processing nodes over a network. Each storage cluster node may be configured to manage access to a respective set of persistent storage devices. Each processing node provided the registration key may be authorized to access each of the persistent storage devices.

According to another aspect of the present disclosure, a system may include a plurality of processing nodes configured to operate a data store system. The system may further include a plurality of persistent storage device sets. The system may further include a plurality of storage cluster nodes. Each storage cluster node may be associated with a respective storage device set. Each storage cluster node may be in communication with the plurality of processing nodes over a network. Each storage cluster node may be configured to manage access of the respective persistent storage device set to the plurality of processing nodes. A selected processing node from the plurality of processing nodes may generate a registration key in response to identify a non-responsive processing node in the plurality of processing nodes. The selected processing node may provide the registration key to other processing nodes of the plurality of processing nodes excluding the identified non-responsive processing node. Each storage cluster node may register the registration key. In response to registration of the registration key, each storage cluster node may grant access to the respective persistent storage device set to a processing node having the registration key.

According to another aspect of the present disclosure, a computer-readable medium may be encoded with a plurality of instructions executable by a processor. The plurality of instructions may include instructions to generate a registration key in response to identification of a non-responsive processing node in a plurality of processing nodes. The plurality of instructions may further include instructions to provide the registration key to the other processing nodes of the plurality of processing nodes excluding the identified non-responsive processing node. The plurality of instructions may further include instructions to provide the registration key to a plurality of storage cluster nodes in communication with the plurality of processing nodes over a network. Each storage cluster node may be configured to manage access to a respective set of persistent storage devices. Each processing node provided the registration key may be authorized to access each of the persistent storage devices.

BRIEF DESCRIPTION OF THE DRAWINGS

The present disclosure may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE FIGURES

Figure 1:
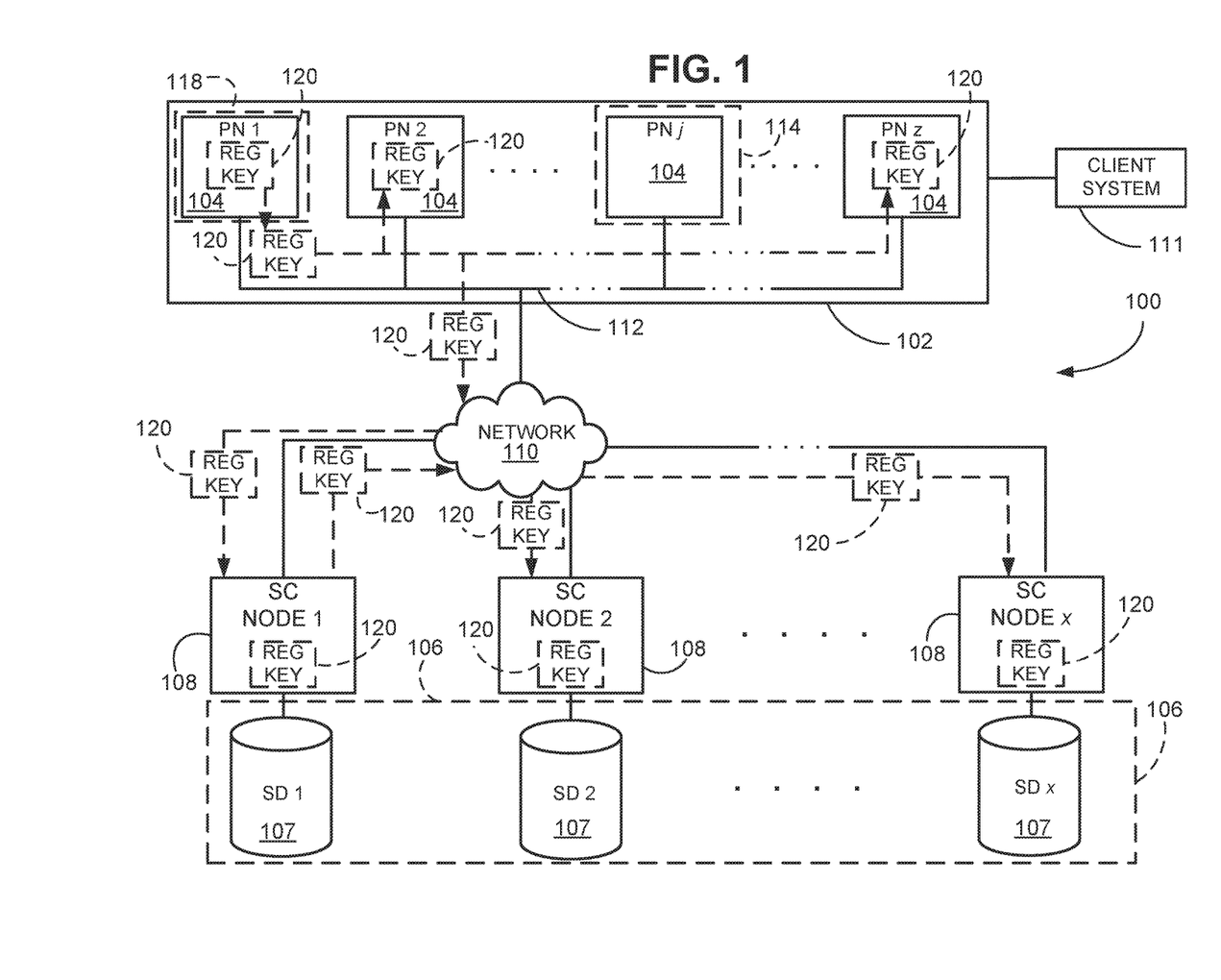
FIG. 1 is an example block diagram of a database having network storage.

FIG. 1 is a diagrammatic representation of example architecture for a database system 100, such as a Teradata Active Data Warehousing System®. In one example, the database system 100 includes a relational database management system (RDBMS) 102 that implements a parallel-processing environment to carry out database management. The RDBMS 102 may be a combination of software (e.g., computer program routines, subroutines, applications, etc.) and hardware (e.g., processors, memory, etc.). In the example of FIG. 1, the RDBMS 102 may be a massive parallel processing (MPP) system having an array of processing units and distributed memory. The RDBMS 102 may include one or more processing nodes 104, individually designated as PN 1 through z where z is the number of processing nodes 104, used to manage the storage, retrieval, and manipulation of data in a storage device array 106. In one example, the storage device array 106 may include storage devices 107, individually designated as SD 1 through SD x, where x is the number of storage devices 107. Each storage device 107 may represent one or more various disks, such as hard disk drives, flash drives, and any other persistent storage devices, and in some examples, memory devices. In one example, the RDBMS 102 may implement network storage, which requires that the storage devices 107 be accessed via a network 110. The network 110 may be wired, wireless, or some combination thereof. The network 110 may be a virtual private network, web-based, directly-connected, or some other suitable network configuration.

Each of the storage devices 107 may be associated with a storage cluster node 108 individually designated as SC node 1 through SC node x corresponding with the storage devices 107. Each storage cluster node 108 may be responsible for allowing access to the storage device array 106. In particular, each storage cluster node 108 may be responsible for a respective storage device 107, such that each storage cluster node 108 authorizes any access to the data stored in the respective storage device 107. Each storage device 107 depicted in FIG. 1 may include one or more storage device managed by the associated storage cluster node 108. The storage cluster nodes 108 may communicate with the RDBMS 102 and one another over the network 110. In other examples, one or more of the storage cluster nodes 108 may communicate directly or via a sub-network.

Figure 2:
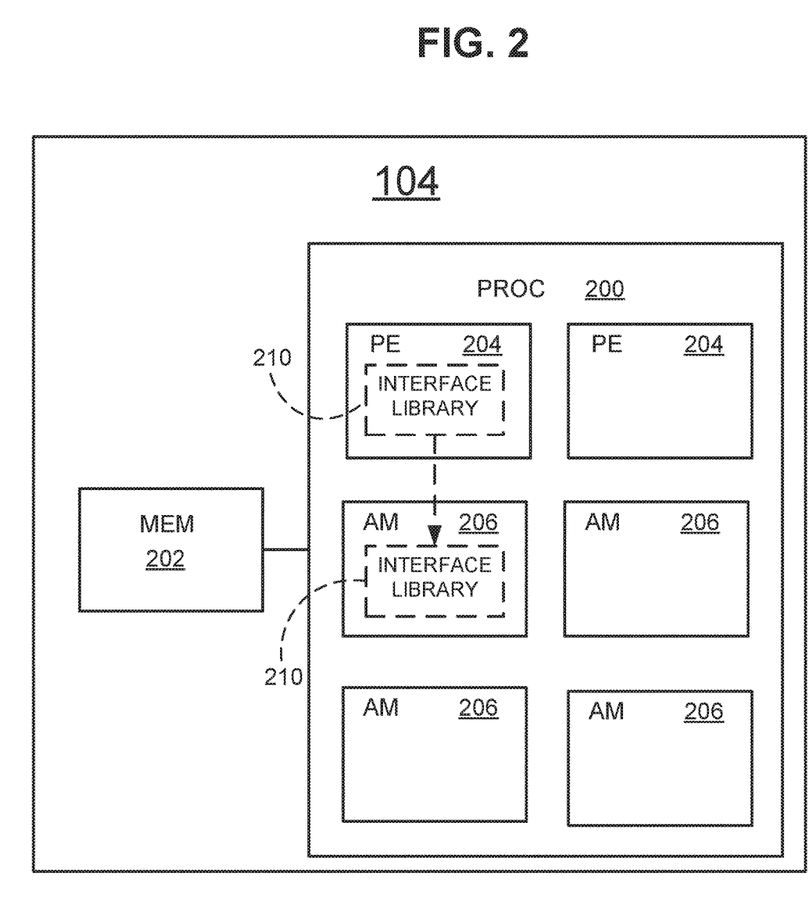
FIG. 2 is an example block diagram of a processing node.

FIG. 2 provides an example of a processing node 104. Each processing node 104 may include one or more physical processors 200 and memory 202. The memory 202 may include one or more memories and may be computer-readable storage media or memories, such as a cache, buffer, RAM, removable media, hard drive, flash drive or other computer-readable storage media. Computer-readable storage media may include various types of volatile and non-volatile storage media. Various processing techniques may be implemented by the processors 200 such as multiprocessing, multitasking, parallel processing and the like, for example.

As shown in FIG. 2, each processing node 104 may include one or more other processing unit arrays such as parsing engine (PE) modules 204 and access modules (AM) 206. As described herein, each module, such as the parsing engine modules 204 and access modules 206, may be hardware or a combination of hardware and software. For example, each module may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, each module may include memory hardware, such as a portion of the memories 202, for example, that comprise instructions executable with the processors 200 or other processors to implement one or more of the features of the module. When any one of the modules includes the portion of the memories 202 that comprise instructions executable with the processors 200, the module may or may not include the processors 200. In some examples, each module may just be the portion of the memories 202 or other physical memory that comprises instructions executable with the processors 200 or other processor to implement the features of the corresponding module without the module including any other hardware. Because each module includes at least some hardware even when the included hardware comprises software, each module may be interchangeably referred to as a hardware module, such as the processing engine hardware module 204, and the access module hardware module 206. The access modules 206 may be access modules processors (AMPs), such as those implemented in the Teradata Active Data Warehousing System®.

The parsing engine modules 204 and the access modules 206 may each be virtual processors (vprocs) and/or physical processors. In the case of virtual processors, the parsing engine modules 204 and access modules 206 may be executed by one or more physical processors, such as those that may be included in the processing nodes 104. For example, in FIG. 2, each parsing engine module 204 and access module 206 is associated with a respective processing node 104 and may each be executed as one or more virtual processors by physical processors 200 included in the respective processing node 108.

Each processing node 104 may include multiple parsing engine modules 204 and access modules 206 such that there are more parsing engine modules 204 and access modules 206 than processing nodes 104. In one example, during operation, the one or more physical processors 200 included in the processing nodes 104 may execute the parsing engine modules 204 and access modules 206 by switching between the executions of the various modules at a rapid rate allowing the vprocs to substantially operate in "parallel."

Database data, such as database tables, may be stored in various formats, such as row or columnar format. Each parsing engine module 204 may organize the storage of data and the distribution of database tables. The parsing engine modules 204 may also coordinate the retrieval of data from the storage devices 107 in response to queries received, such as those received from a client computer system 111 connected to the RDBMS 102 through a direct connection, the network 110, or other network for example.

Figure 3:
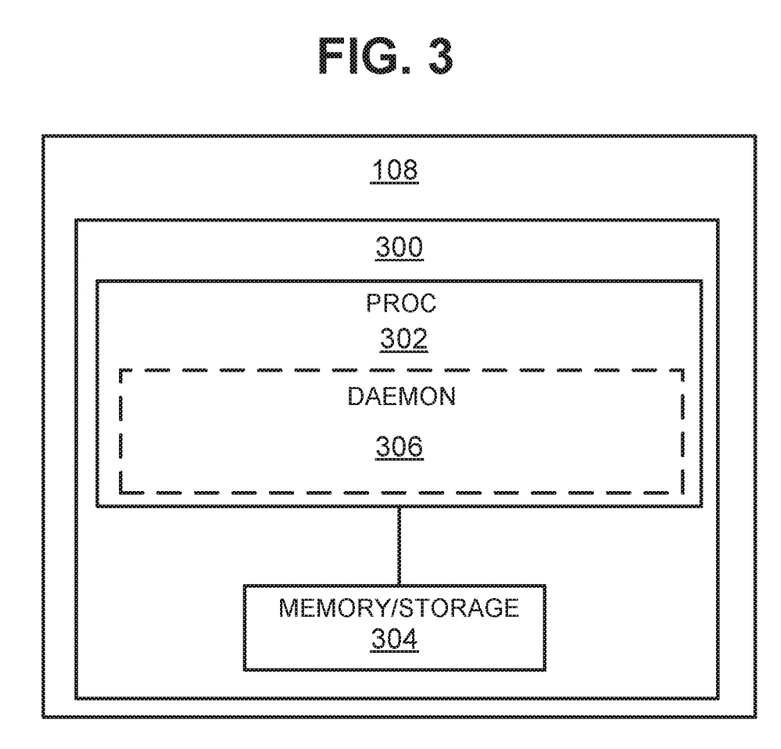
FIG. 3 is an example block diagram of a storage cluster node.

FIG. 3 is an example of a storage cluster node 108. In one example, each storage cluster node 108 may include one or more independent processing units 300. Each processing unit 300 may include one or more processors 302 and memories/storage 304. The memory/storage 304 may include one or more memories and/or persistent storage devices and may be computer-readable storage media or memories, such as a cache, buffer, RAM, removable media, hard drive, flash drive or other computer-readable storage media. Computer-readable storage media may include various types of volatile and nonvolatile storage media. Each processing unit 300 may have the ability to access data associated with storage devices such as the respective storage devices 107. Each storage cluster node 108 may include a single or multiple processing units 302 or include a single processing unit 300 with multiple processors 302. During operation, one or more processors 302 may execute one or more daemons to handle various background processes, such as daemon 306. Daemon 306 of each storage cluster node 108 may be responsible for setting firewall protections to determine which data packets received from the processing nodes 104 may access the storage devices 107. Each daemon 306 may prevent or allow access to the storage devices 107 via the storage cluster nodes 108, thus, the daemon 306 is ultimately responsible for allowing access to the associated storage devices 107. Various techniques may be employed by each daemon 306 to prevent disk access, such as firewall protocols, which in one example may be Linux-based iptables. However, other firewall protocols may be used by the daemons 306.

Referring again to FIG. 1, an interconnection 112 allows communication to occur within and between each processing node 104. For example, implementation of the interconnection 112 provides media within and between each processing node 104 allowing communication among the various processing nodes 104. Such communication among the processing nodes 104 may include communication between parsing engine modules 204 associated with the same or different processing nodes 104, as well as, communication between the parsing engine modules 204 and the access modules 206 associated with the same or different processing nodes 104. Through the interconnection 112, the access modules 206 may also communicate with one another within the same associated processing node 104 or other processing nodes 104.

The interconnection 112 may be hardware, software, or some combination thereof. In instances of at least a partial-hardware implementation the interconnection 112, the hardware may exist separately from any hardware (e.g. processors, memory, physical wires, etc.) included in the processing nodes 104 or may use hardware common to the processing nodes 104. In instances of at least a partial-software implementation of the interconnection 112, the software may be stored and executed on one or more of the memories 202 and processors 200, respectively, of the processing nodes 104 or may be stored and executed on separate memories and processors that are in communication with the processor nodes 104. In one example, interconnection 112 may include multi-channel media such that if one channel ceases to properly function, another channel may be used. Additionally or alternatively, more than one channel may also allow distributed communication to reduce the possibility of an undesired level of communication congestion among processing nodes 104.

During operation, each access module 206 may be associated with dedicated portions of the storage devices 107 on which data is stored and accessed. This "shared nothing" architecture ensures that each access module 206 has exclusive access to particular logical portions of the physical disks of the data storage devices 107. In one example, one or more processing nodes 104, such as processing node PN j, may fail such that it becomes non-responsive to additional commands, designated in FIG. 1 as non-responsive node 114. In one example, when a failed processing node 104 is detected, the access modules 206 may be "moved" to another processing node 104. In other words, responsibilities of the access modules 206 of the non-responsive node 114 may be transferred to access modules 206 of properly-functioning processing nodes 104. However, even after the responsibilities have been transferred, the non-responsive node 114 may begin to operate and continue to execute a task or any other tasks assigned prior to becoming non-responsive. This may result in the non-responsive node 114 continuing to write to the dedicated portions of the storage devices 107, while another processing node 104 may be also attempt to write to the same dedicated portion due to receiving the access modules 206 of the non-responsive node 114.

In one example, the RDBMS 102 may implement a single registration key used by all authorized processing nodes 104 to access the storage devices 107. Moreover, the registration key may also be provided to the storage cluster nodes 108 allowing the storage cluster nodes 108 to prevent unauthorized processing nodes. In FIG. 1, a processing node 104 may be selected as a check node 118, which in the example of FIG. 1 is processing node PN 1. The check node 118 may be responsible for generating the registration key and providing it to properly operating processing nodes 104 and at least one storage cluster node 108. In FIG. 1, once the non-responsive node 114 has been identified by the check node 118 or other properly operating processing node 104, the RDBMS 102 may be restarted. Upon restart, the check node 118 may generate a new registration key 120 and provide it to all processing nodes 104 except the non-responsive node 114. The check node 118 may also provide the registration key 120 to a particular storage cluster node 108. The receiving storage cluster node 108, which in this example is SC node 1, may provide the registration key 120 to other storage cluster nodes 108 allowing each storage cluster node 108 to exclude processing nodes 104 from accessing the storage devices 107 that fail to provide the registration key 120, such as the non-responsive node 114.

The registration key 120 may contain various identifiers. In one example, the registration key 120 may be eight bytes in length. Two bytes may be used to identify the RDBMS 102 implementing the key. Two different bytes may be used to identify the particular processing node 104 serving as the check node 118. Two other bytes may be used to identify the number of the particular operating cycle of the RDBMS 102. In one example, each time the RDBMS 102 is restarted, a cycle counter may be incremented. The cycle counter represents the number of startups and/or restarts, which may be represented by two bytes of the registration key 120. The final two bytes may represent the number of processing nodes 104 currently operating in the RDBMS 102 in a proper fashion. Thus, this number excludes non-responsive nodes. Alternative examples may include registrations keys with fewer or additional bytes, different byte orders, and/or byte representations.

Referring to FIG. 2, in one example, a processing node 104 selected as the check node 118 may access an interface library 210. The interface library 210 may contain various functions to be executed allowing the registration keys to be distributed to selected processing nodes 104 and to the storage cluster nodes 108. Through the interface library 210, the check node 118 may communicate with the storage cluster nodes 108 through an appropriate network protocol such as User Datagram Protocol (UDP). In other examples, other network protocols may be implemented. The interface library 210 may be stored in each processing node 104 or may be provided to less than all processing nodes 104, which may be accessed when a particular processing node 104 is selected as the check node 118. In another example, the interface library 210 may be stored in other storage device(s) within the RDBMS 102. Upon determination that a registration key needs to be generated, the check node 118 may access the interface library 210, which may allow various functions within the interface library 210 to be executed by one or more processors 200 of the check node 118.

Figure 4:
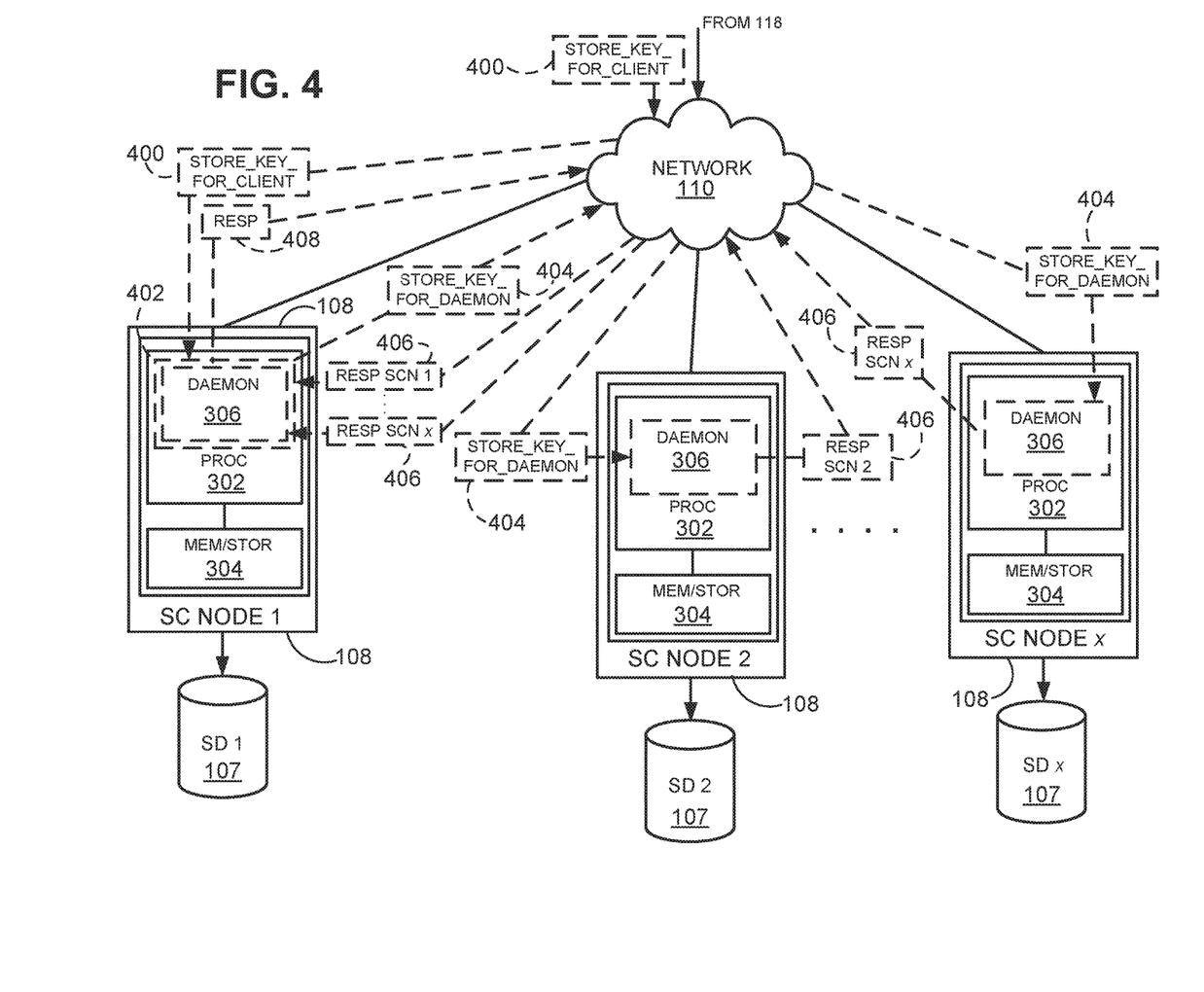
FIG. 4 is an example of a key registration process in a database system.

FIG. 4 is a detailed block diagram of the interaction of the storage cluster nodes 108 during receipt of the registration key 120. In one example, the interface library 210 may contain a function CreateNewKey( ), which generates a new registration key. The CreateNewKey( ) function also allows the check node 118 to generate a STORE_KEY_FOR_CLIENT message 400, which causes a daemon 306, designated as check daemon 402 in FIG. 4, to issue firewall commands to all daemons 306 operating on the storage cluster nodes 108 such that the daemons 306 configure the firewalls across the respective storage cluster nodes 108 to drop packets received from any processing node 104 until additional commands are received. In one example, this may include dropping packets for specific transmission control protocol (TCP) ports from all processing nodes 104. In the example of FIG. 4, the firewall command instructions may be issued via a STORE_KEY_FOR_DAEMON message 404 sent by a check daemon 402 to other daemons 306.

The STORE_KEY_FOR_DAEMON message 404 may contain the registration key 120 to be stored by each daemon 306. Upon receipt of the STORE_KEY_FOR_DAEMON message 404, each daemon 306 may generate a confirmation response message 406 and transmit the confirmation response message 406 to the selected daemon 402 to indicate receipt and acceptance of the registration key 120 in the STORE_KEY_FOR_DAEMON message 404. Upon receipt of all confirmation response messages 406 by daemons 306 recognized by the check daemon 402, the check daemon 402 may generate a confirmation response 408 to the check node 118 to inform the check node 118 that the registration key 120 has been received by all involved daemons 306.

In one example, in response to receipt of the STORE_KEY_FOR_DAEMON message 400, each daemon 306 may turn on firewalls that block TCP connections to specific ports used to receive packets from any processing node 104. In one example, the daemons 306 may invoke a Linux-based set of "iptables" commands to block the TCP connections to the specific ports. However, the RDBMS 102 is not limited to iptables commands and, in other examples, various firewall techniques and protocols may be used separately or together.

Figure 5:
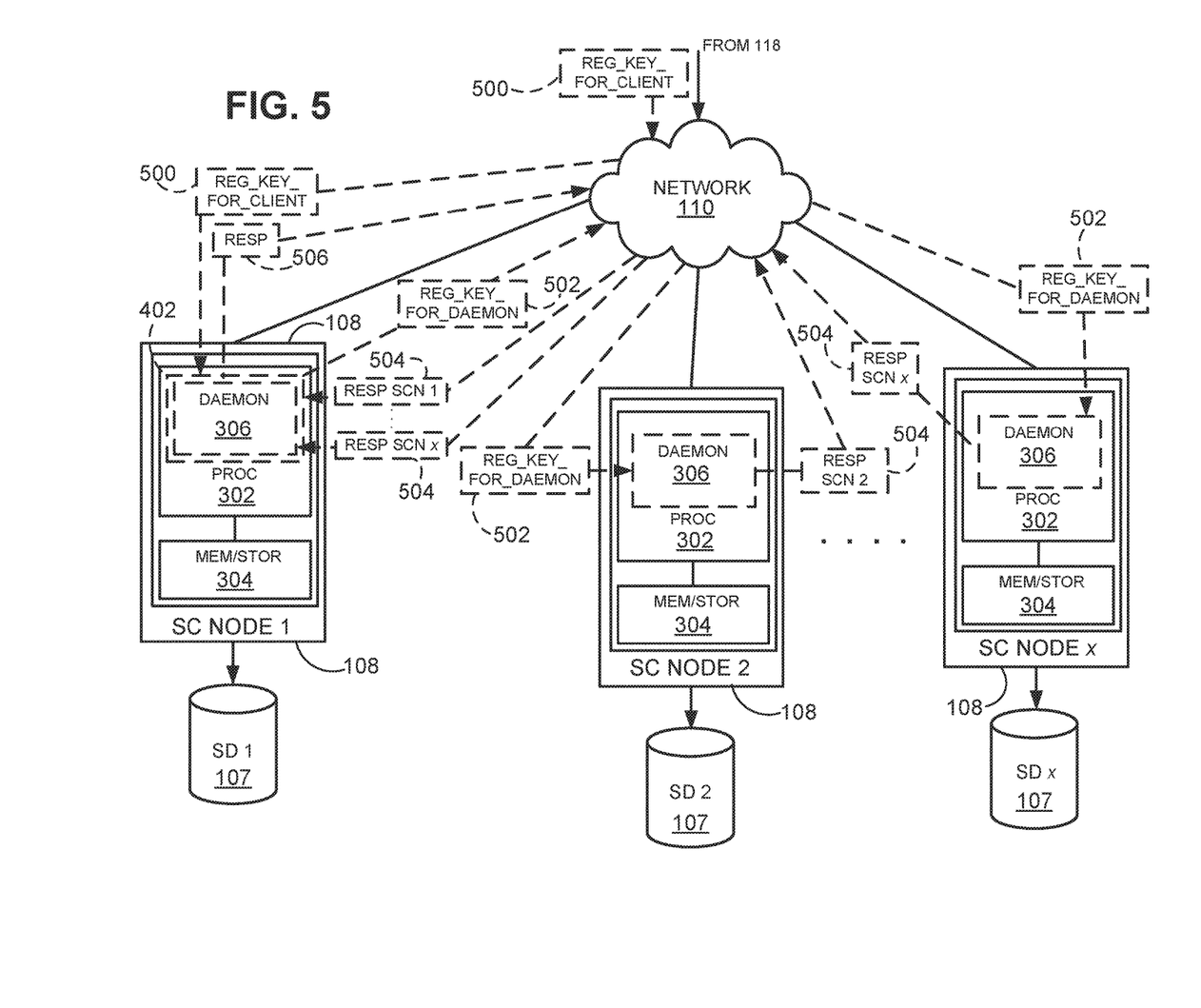
FIG. 5 is another example of another portion of the key registration process of FIG. 4

The interface library 210 may also contain a function RegisterKey( ), which, when executed, may manage registration of the registration key 120 with the storage cluster nodes 108. FIG. 5 is a detailed block diagram of example of the registration process. In one example, execution of the RegisterKey( ) function by the check node 118 may generate a REG_KEY_FOR_CLIENT message 500 to be transmitted to the check daemon 402 to request registration of the registration key 120, which includes a registration request and the registration key 120. Upon receipt of the REG_KEY_ FOR_CLIENT message 500 by the check daemon 402, the check daemon 402 may register the registration key 120 by comparing it to stored version received in the STORE_KEY_FOR_CLIENT message 400, which effectively acknowledges that any packet transmitted by the processing nodes 104 bearing the registration key 120 will be authorized. Upon registration of the registration key 120, the check daemon 402 may issue a response REG_KEY_ FOR_DAEMON message 502 to all daemons 306 that are responsible for handling authorization of packets from the processing nodes 104. Upon receipt of the REG_KEY_ FOR_DAEMON message 502, each daemon 306 in receipt may issue an confirmation response message 504 acknowledging to the check daemon 402 that the registration key 120 has been registered by comparing and confirming a match to the registration key 120 contained in the REG_KEY_FOR_ DAEMON message 502 with the registration key 120 stored from prior receipt of the STORE_KEY_FOR_DAEMON message 404. Once the comparison is made and a match is confirmed, each daemon 306 may begin receiving data packets from the processing nodes 104. The check daemon 402 may transmit a confirmation response message 506 to the check node 118 to indicate that the daemons 306 have registered the registration key 120. In examples implementing iptables commands, each daemon 306 may open ports previously blocked from TCP connections to receive packets from processing nodes having the registration key 120.

In one example, the daemons 306 may also be able to execute a Startup_Synch function, which may generate a message sent by a daemon 306 when it starts up to obtain the current registration key 120 from any daemons 306 that are currently running. Upon receipt of this message, a daemon 306 replies with its current registration key. Upon receiving the registration key 120, the daemon 306 will process it as if it had received a STORE_KEY_FOR_DAEMON 404 message.

The examples of FIGS. 4 and 5 indicate one processing unit 300 per storage cluster node 108 with a single daemon 306 handling the registration process. In other examples, each storage cluster node 108 may include additional processing units 300 executing multiple daemons 306. Other examples may also include virtual processors executed on one or more processor 300 at each storage cluster nodes 108. In examples involving multiple daemons 306 running at each storage cluster node, each daemon 306 may participate in the key registration process and manage the firewall protocols for a particular processor 302 and/or virtual processors. In examples including multiple daemons 306 running on the storage cluster nodes 108, the check daemon 402 may communicate directly with any daemons 306 running on the same storage cluster node 108 and over the network 110 to other daemons 306 running on other storage cluster nodes 108.

Figure 6:
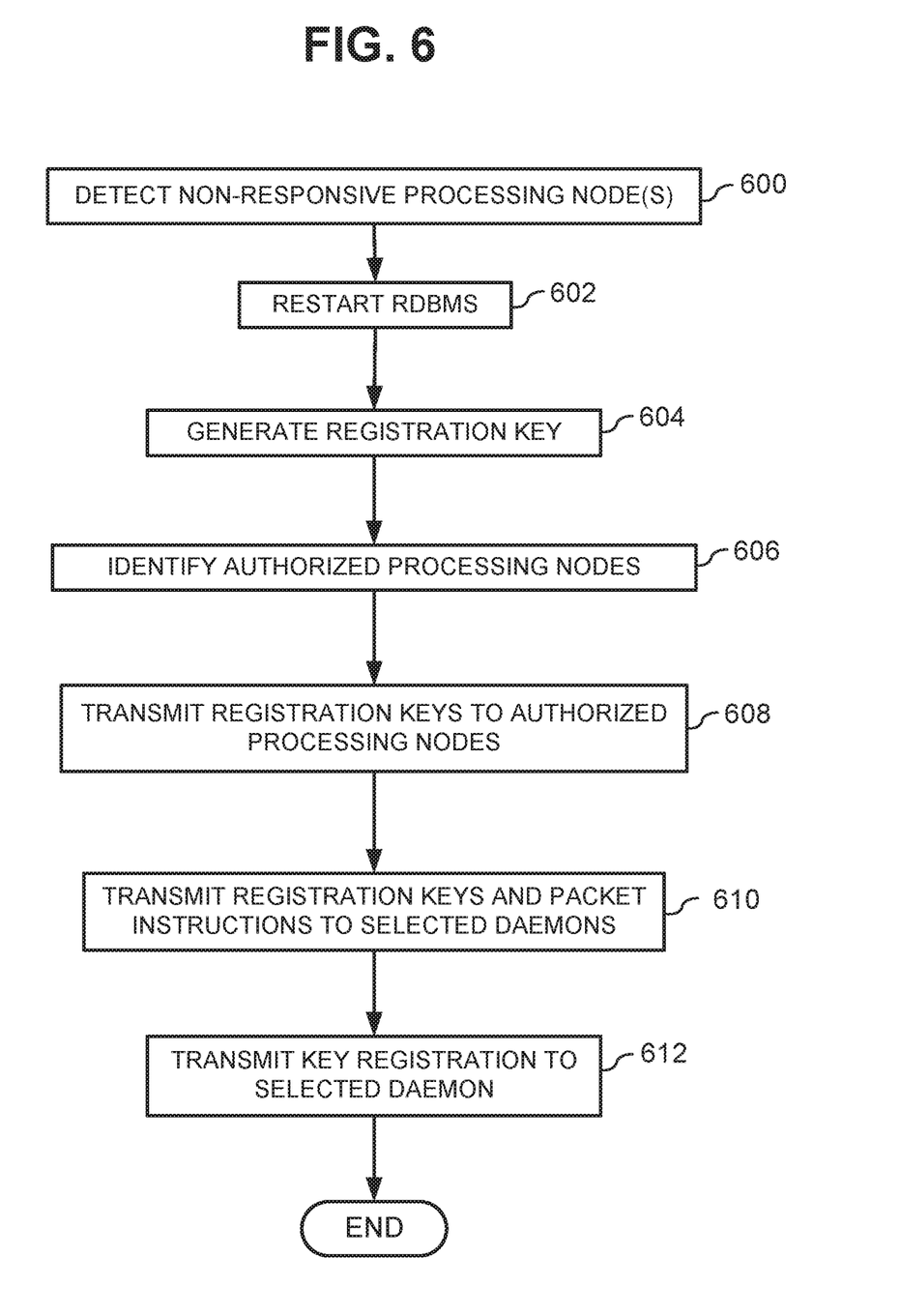
FIG. 6 is an operational flow diagram of a database system during an example key registration process.

FIG. 6 is an operational flow diagram of the RDBMS 102 operation during a key registration process in a network storage configuration. In one example, one or more non-responsive processing nodes 114 may be detected by the RDBMS 102 (600). The RDBMS 102 may be restarted (602). Upon restart, the RDBMS 102 may generate a new registration key 120 (604). The RDBMS 102 may identify the processing nodes 104 authorized to receive the new registration key 120 (606), which includes all processing nodes 104 not included as the one or more non-responsive processing nodes 114 detected at (600). The RDBMS 102 may transmit the registration key 120 to the authorized processing nodes 104 (608).

Once the authorized processing nodes 104 have acknowledged receipt of the registration key 120, the RDBMS 102 may transmit the registration key 120 to the selected daemons 306 (610). In one example, packet handling instructions may also be transmitted along with the registration key 120, such as instructions to drop all packets. The RDBMS 102 may transmit a key registration to the selected daemons 306 (612), which may enable the selected daemons 306 to configure the firewalls to allow packets from the processing nodes 104 having the registration key 120 to be accepted by the storage cluster nodes 108.

Figure 7:
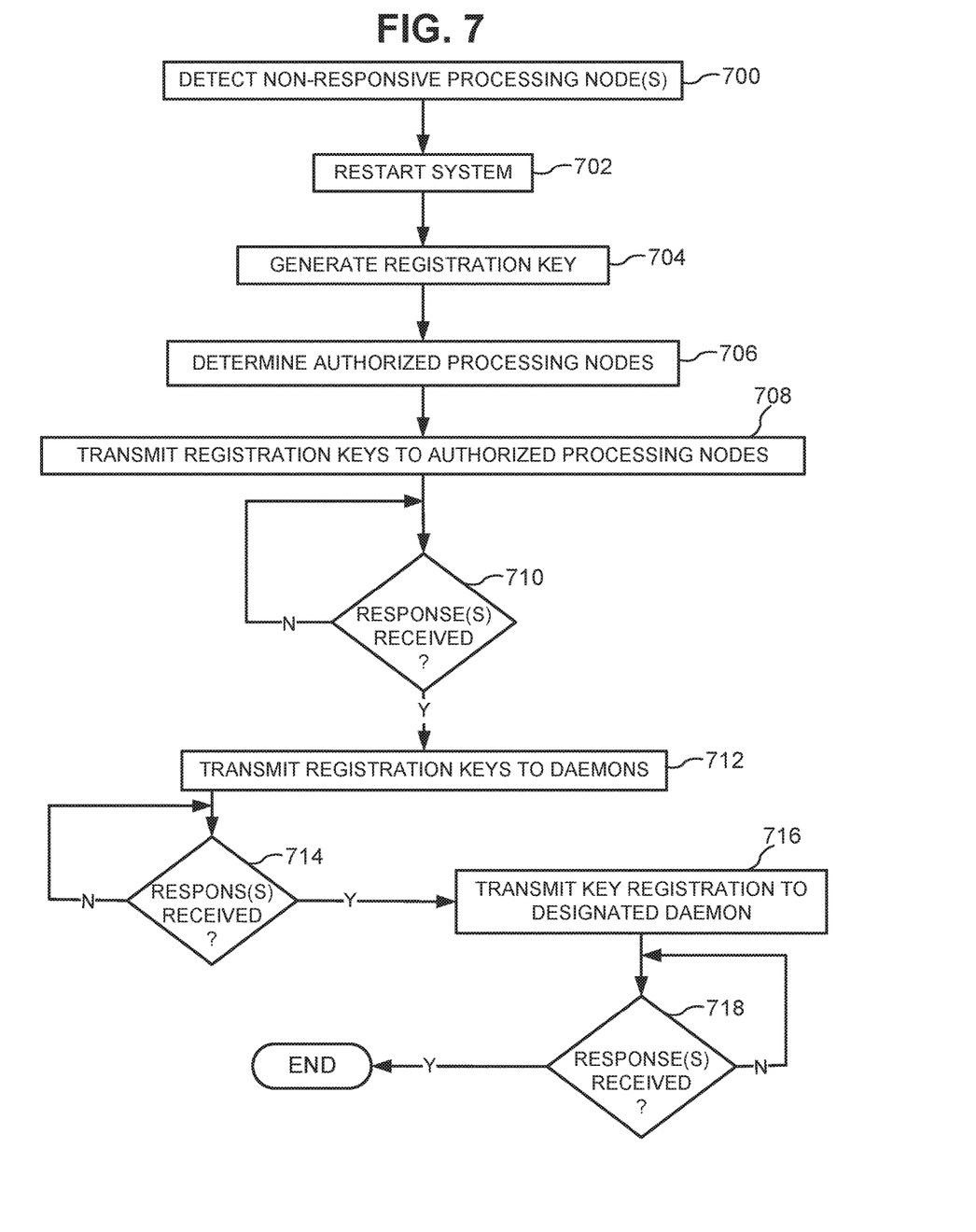
FIG. 7 is an operational flow diagram of processing node operation during an example key registration process.

FIG. 7 is an operational flow diagram for a check node, such as the check node 118, during key registration. In one example, one or more non-responsive processing nodes 104 may be detected (700). Detection of the non-responsive nodes may be performed by the check node 118 and/or other properly-functioning processing nodes 104 in the RDBMS 102. The RDBMS 102 may be restarted based on the detection of one or more non-responsive processing nodes 104. Once the system restart occurs (702), the check node 118 may generate the registration key 120 (704). In one example, the check node 118 may execute a function, such as the CreateNewKey( ), to generate the registration key 120. The check node 118 may determine the processing nodes 104 authorized to receive the registration key 120

(706), which may be based on information stored prior to the system restart or may be determined by the check node 118 or other RDBMS 102 component subsequent to the system restart. The check node 118 may transmit the registration key 120 to the authorized processing nodes 104 (708). The check node 118 may determine if a response is received from each authorized processing nodes 104 (710). In one example, the check node 118 may refrain from further action regarding key registration until all authorized processing nodes 104 have acknowledged receipt. In other examples, other manners of confirmation that the authorized processing nodes 104 have received the check node 118 may be implemented.

The check node 118 may transmit the registration key 120 to the selected daemons 306 (712) of the storage cluster nodes 108. In one example, the check node 118 may transmit the STORE_KEY_FOR_CLIENT message 400 to the check daemon 402, which, in response, may transmit the STORE_KEY_FOR_DAEMON message 404 to the other selected daemons 306. In other examples, other registration key distributions may be implemented. The check node 118 may await an acknowledgement that the selected daemons 306 have received the registration key 120 (704). In one example, the check node 118 may await receipt of confirmation response 408 from the check daemon 402 that indicates all selected daemons 306 have received the registration key 120 and acknowledged receipt to the check daemon 306 with the confirmation response message 406.

The check node 118 may transmit a key registration to the selected daemons 306 of the storage cluster nodes 108 (716), which in one example, may be generated from the function RegisterKey( ). In one example, the check node 118 may transmit the REG_KEY_FOR_CLIENT message 500 to the check daemon 402, which, in response, may transmit the REG_KEY_FOR_DAEMON message 502 to the other selected daemons 306. In other examples, other key distributions may be implemented. The check node 118 may await an acknowledgement that the selected daemons 306 have received the registration key 120 (718). In one example, the check node 118 may await receipt of confirmation message 506 from the check daemon 402 that indicates all selected daemons 306 have registered the registration key 120 and acknowledged receipt to the check daemon 306 with the confirmation response message 504. Once the registration key 120 is registered at the selected daemons 306, authorized processing nodes 104 having the registration keys may begin accessing the disks via the storage cluster nodes 108.

Figure 8:
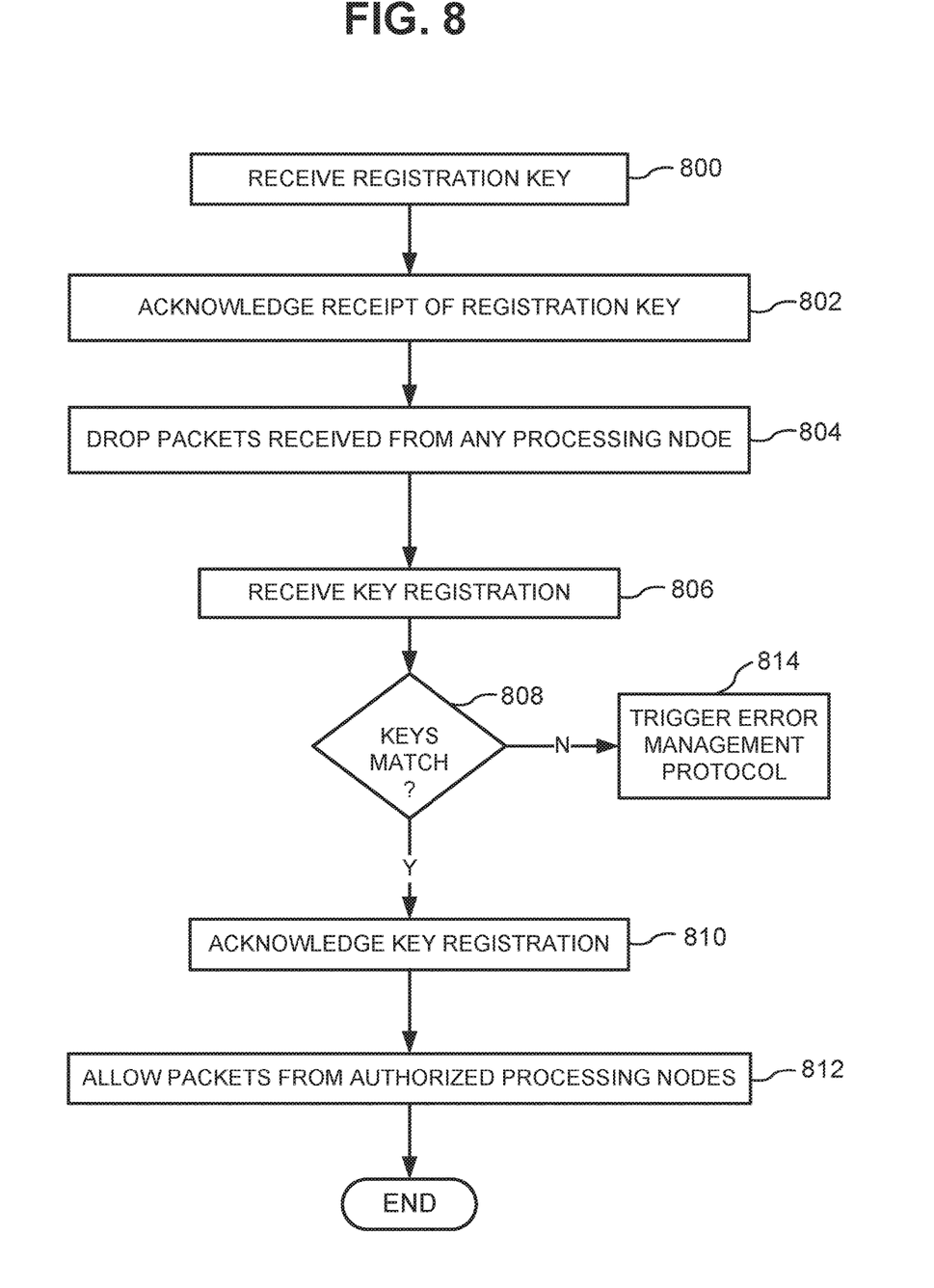
FIG. 8 is an operational flow diagram of storage cluster node operation during an example key registration process.

FIG. 8 is an operational flow diagram of a selected daemon 306 during key registration. In one example, the selected daemon 306 may receive the registration key 120 (800), which may be stored in the associated processing unit 300. In one example, the registration key 120 may be included in the STORE_KEY_FOR_DAEMON message 502, which may also include instructions on handling packets from the processing nodes 104. The selected daemon 306 may acknowledge receipt of the registration key 120 through generation of a confirmation messages, such as a confirmation response message 406 (802). Once the registration key 120 has been accepted, the selected daemon 306 may drop any packets received from the processing nodes 104 (804). In one example, the selected daemon 306 may invoke firewall protocols, such as through iptables, for example, at specific ports so that the packets are dropped and cannot gain access to the associated storage devices 107. The selected daemon 306 may receive a key registration message, such as STORE_KEY_FOR_DAEMON message 502, which includes the registration key 120 for comparison to the stored copy of the registration key 122 (806). The selected daemon 306 may compare the stored registration key 120 with that contained in the message 502 (808). If the registration key in the message 502 matches the registration key 120 stored for the selected daemon 306, the selected daemon 306 may acknowledge the registration (810), such as through the confirmation response message 504, for example, begin receiving packets from processing nodes 104 having the registration key 120 (812). In one example, the firewall protocols may be adjusted to allow the packets to be received. In the event the registration keys do not match, an error management protocol may be initiated (814), which may suspend any access to the respective storage device 107 and require manual intervention further address the error.

While various examples of the invention have been described, it will be apparent to those of ordinary skill in the art that many more examples and implementations are possible within the scope of the invention. For example, a database system has been used to provide various examples. However, other data stores, such as file systems, for example, or any other suitable data store may be implemented with the various examples. Accordingly, the invention is not to be restricted except in light of the attached claims and their equivalents.

We claim:
1. A method of operating a data store system comprising:
generating a registration key in response to identification of a non-responsive processing node in a plurality of processing nodes, wherein the identification of the non-responsive processing node is based on failure of the non-responsive processing node to properly respond to at least one of the other processing nodes in the plurality of processing nodes;
providing the registration key to the other processing nodes excluding the identified non-responsive node; and
providing the registration key to a plurality of storage cluster nodes in communication with the plurality of processing nodes over a network, wherein each storage cluster node is configured to manage access to a respective set of persistent storage devices, and wherein each processing node provided the registration key is authorized to access each of the persistent storage devices.

2. The method of claim 1, further comprising selecting a processing node from the plurality of processing nodes, wherein:
generating the registration key comprises generating the registration key with the selected processing node; and
providing the registration key comprises providing the registration key to each processing node included in the other processing nodes.

3. The method of claim 1, further comprising selecting a storage cluster node from the plurality of storage cluster nodes, wherein providing the registration key to the plurality of storage cluster nodes comprises:
providing the registration key to the selected storage cluster node; and
providing the registration key to the other storage cluster nodes in the plurality of storage cluster nodes with the selected storage cluster node.

4. The method of claim 3, further comprising:
in response to receipt of the registration key:
transmitting an acknowledgement message from each of the other storage cluster nodes to the selected storage cluster node; and
for each storage cluster node, preventing the processing nodes from accessing the respective set of persistent storage devices by each storage cluster node.

5. The method of claim 4, further comprising:
transmitting a key registration message to each of the storage cluster nodes to register each registration key; and
transmitting an acknowledgement message from each of the other storage cluster nodes to the selected storage cluster node acknowledging registration.

6. The method of claim 5, further comprising:
in response to registration of the registration key, allowing each storage cluster node to receive data packets from the processing nodes having the registration key, wherein the data packets are associated with accessing the persistent storage devices.

7. The method of claim 6, further comprising controlling firewall settings in each storage cluster node to prevent the processing nodes from accessing the respective set of persistent storage devices and to allow each storage cluster node to access the respective set of persistent storage devices.

8. A system comprising:
a plurality of processing nodes configured to operate a data store system;
a plurality of persistent storage device sets; and
a plurality of storage cluster nodes, wherein each storage cluster node is associated with a respective persistent storage device set, wherein each storage cluster node is in communication with the plurality of processing nodes over a network, wherein each storage cluster node is configured to manage access of the respective persistent storage device set to the plurality of processing nodes, and wherein a selected processing node from the plurality of processing nodes is configured to:
generate a registration key in response to identification of a non-responsive processing node in the plurality of processing nodes, wherein the identification of the non-responsive processing node is based on failure of the non-responsive processing node to properly respond to at least one of the other processing nodes in the plurality of processing nodes; and
provide the registration key to other processing nodes excluding the identified non-responsive processing node, wherein each storage cluster node is configured to register the registration key, wherein, in response to registration of the registration key, each storage cluster node is configured to grant access to the respective persistent storage device set to a processing node having the registration key.

9. The system of claim 8, wherein the selected processing node is further configured to provide the registration key to a selected storage cluster node from the plurality of storage cluster nodes, wherein the selected storage cluster node is configured to provide the registration key to the other storage cluster nodes in the plurality of storage cluster nodes.

10. The system of claim 9, wherein, in response to receipt of the registration key, each of the other storage cluster nodes is configured to transmit an acknowledgement message to the selected storage cluster node, and wherein, in response to receipt of the acknowledgement messages, the selected storage cluster node is configured to transmit another acknowledgement receipt to the selected processing node to indicate the plurality of storage cluster nodes have received the registration key.

11. The system of claim 10, wherein, in response to receipt of the registration key, each of the storage cluster nodes is configured to prevent access to the respective persistent storage device sets by the plurality of processing.

12. The system of claim 11, wherein the selected processing node is further configured to transmit a key registration message to the selected storage cluster node to register the registration key, and wherein the selected storage cluster node is configured to transmit another key registration message to the other storage cluster nodes to register the registration key with the other storage cluster nodes.

13. The system of claim 12, wherein the in response to receipt of key registration message, each of the other storage cluster nodes is configured to transmit a registration acknowledgement message to the selected storage cluster node, and wherein, in response to receipt of the registration acknowledgement messages, the selected storage cluster node is configured to transmit another registration acknowledgement receipt to the selected processing node to indicate the plurality of storage cluster nodes have registered the registration key.

14. The system of claim 13, wherein in response to registration of the registration key, each storage cluster node is configured to receive data packets from the processing nodes having the registration key, wherein the data packets are associated with accessing each persistent storage device set.

15. A computer-readable medium encoded with a plurality of instructions executable by a processor, the plurality of instructions comprising:
instructions to generate a registration key in response to identification of a non-responsive processing node in a plurality of processing nodes, wherein the identification of the non-responsive processing node is based on failure of the non-responsive processing node to properly respond to at least one of the other processing nodes in the plurality of processing nodes;
instructions to provide the registration key to the other processing nodes excluding the identified non-responsive processing node; and
instructions to provide the registration key to a plurality of storage cluster nodes in communication with the plurality of processing nodes over a network, wherein each storage cluster node is configured to manage access to a respective set of persistent storage devices, and wherein each processing node provided the registration key is authorized to access each of the persistent storage devices.

16. The computer-readable medium of claim 15, wherein the plurality instructions further comprises instructions to select a processing node from the plurality of processing nodes, wherein the instructions to generate the registration key comprise instructions to generate the registration key with the selected processing node, and wherein the instructions to provide the registration key comprise instructions to provide the registration key to each processing node included in the other processing nodes.

17. The computer-readable medium of claim 15, wherein the plurality of instructions further comprises instructions to select a storage cluster node from the plurality of storage cluster nodes, wherein the instructions to provide the registration key to the plurality of storage cluster nodes comprises:

instructions to provide the registration key to the selected storage cluster node; and instructions to provide the registration key to the other storage cluster nodes in the plurality of storage cluster nodes with the selected storage cluster node.

18. The computer-readable medium of claim 17, wherein the plurality of instructions further comprises, in response to receipt of the registration key:

instructions to transmit an acknowledgement message from each of the other storage cluster nodes to the selected storage cluster node; and for each storage cluster node, instructions to prevent the processing nodes from accessing the respective set of persistent storage devices by each storage cluster node.

19. The computer-readable medium of claim 18, wherein the plurality of instructions further comprises:

instructions to transmit a key registration message to each of the storage cluster nodes to register each registration key; and instructions to transmit an acknowledgement message from each of the other storage cluster nodes to the selected storage cluster node acknowledging registration.

20. The computer-readable medium of claim 19, wherein the plurality of instructions further comprises, in response to registration of the registration key, instructions to allow each storage cluster node to receive data packets from the processing nodes having the registration key, wherein the data packets are associated with accessing the persistent storage devices.

* * * * *